(12) United States Patent
Marin et al.

(10) Patent No.: US 9,878,313 B2
(45) Date of Patent: Jan. 30, 2018

(54) ONE-POT METHOD FOR THE SYNTHESIS OF CU-SSZ-13, THE COMPOUND OBTAINED BY THE METHOD AND USE THEREOF

(71) Applicant: Haldor Topsoe A/S, Kgs. Lyngby (DK)

(72) Inventors: Manuel Moliner Marin, Valencia (ES); Raquel Martinez Franco, Manises (ES); Avelino Corma Canós, Valencia (ES); Joakim Reimer Thøgersen, Virum (DK)

(73) Assignee: Haldor Topsoe A/S, Lyngby (DK)

( * ) Notice: Subject to any disclaimer, the term of this patent is extended or adjusted under 35 U.S.C. 154(b) by 435 days.

(21) Appl. No.: 14/442,492

(22) PCT Filed: Dec. 6, 2013

(86) PCT No.: PCT/EP2013/075785
§ 371 (c)(1),
(2) Date: May 13, 2015

(87) PCT Pub. No.: WO2014/090698
PCT Pub. Date: Jun. 19, 2014

(65) Prior Publication Data
US 2016/0271596 A1    Sep. 22, 2016

(30) Foreign Application Priority Data
Dec. 12, 2012 (DK) .................................. 2012 00784

(51) Int. Cl.
*C01B 39/06* (2006.01)
*B01J 29/76* (2006.01)
(Continued)

(52) U.S. Cl.
CPC .......... *B01J 29/76* (2013.01); *B01D 53/8628* (2013.01); *B01D 53/9418* (2013.01);
(Continued)

(58) Field of Classification Search
CPC ......... C01B 39/06; C01B 39/48; B01J 29/763
See application file for complete search history.

(56) References Cited

U.S. PATENT DOCUMENTS 4,544,538 A    10/1985  Zones
5,591,421 A     1/1997  Zones
(Continued)

FOREIGN PATENT DOCUMENTS

RU        2153397 C2    7/2000
WO   WO 2009/141324 A1   11/2009

OTHER PUBLICATIONS

Giodanino et al, "Characterization of Cu-Exchanged SSZ-13: a comparative FTIR, UV-vis, and EPR study with Cu-ZSM-5 and Cu-beat with similar Si/Al and Cu/Al ratios", Dalton Trans. (Jun. 2013) pp. 12741-12761.*

(Continued)

*Primary Examiner* — David M Brunsman
(74) *Attorney, Agent, or Firm* — Blank Rome LLP (57) ABSTRACT

Process for the direct synthesis of Cu-SSZ-13 from a synthesis mixture comprising water, at least one silicon source, at least one Al source, at least one Cu source, at least one polyamine for complexing with Cu, and a single organic structure directing agent. A Cu containing molecular sieve having the framework structure of SSZ-13, obtainable by the process and use of the Cu containing molecular sieve.

8 Claims, 3 Drawing Sheets

(51) Int. Cl.
  B01D 53/94    (2006.01)
  C01B 39/48    (2006.01)
  B01D 53/86    (2006.01)
  B01J 37/00    (2006.01)
  B01J 37/10    (2006.01)

(52) U.S. Cl.
  CPC ......... B01J 29/763 (2013.01); B01J 37/0018 (2013.01); B01J 37/10 (2013.01); C01B 39/06 (2013.01); C01B 39/48 (2013.01); B01D 2255/20761 (2013.01); B01D 2255/50 (2013.01)

(56) References Cited

U.S. PATENT DOCUMENTS 8,007,764 B2    8/2011    Miller et al.
2011/0076229 A1    3/2011    Trukhan et al.

OTHER PUBLICATIONS

Ren et al, "Designed copper-amine complex as an efficient template for one-pot synthesis of Cu-SSZ-13 zeolite with excellent activity for selective catalytic reduction of NOx by NH3", Chem. Commun. (May 2011) pp. 9789-9791.*

R. Limin et al., "Design And Synthesis Of A Catalytically Active Cu-Ssz-13 Zeolite From A Copper-Amine Complex Template," *Chinese Journal of Catalysis*, vol. 33, No. 1, Jan. 1, 2012, pp. 92-105.

R. Martinez-Franzo et al., "Rational Direct Synthesis Methodology Of Very Active And Hydrothermally Stable Cu-Sapo-34 Molecular Sieves For Fhe SCR Of NOx", *Applied Catalysis*, vol. 127, Sep. 5, 2012, pp. 273-280.

U. Deka et al., "Changing Active Sites In Cu-Cha Catalysts: Denox Selectivity As A Function Of The Preparation Of Method," *Microporuous and Mesoporuous Materials*, vol. 166, May 8, 2012, pp. 144-152.

Lorena Picone et al., "A Co-Templating Route To The Synthesis Of Cu Sapo Sta-7, Giving An Active Catalyst For The Selective Catalytic Reducation Of NO," *Microporous and Mesoporous Materials*, vol. 146, No. 1, May 7, 2011, pp. 36-47.

* cited by examiner

Figure 1: PXRD patterns of as-prepared Cu-SSZ-13 zeolites synthesized in OH media (Examples 3-6)

Figure 2: UV-Vis spectra of Cu-TEPA complex in solution and as-prepared Cu-SSZ-13 zeolites Figure 3: SEM images of Cu-SSZ13-1 (A), Cu-SSZ13-2 (B), and Cu-SSZ13-4 (C)

Figure 4: PXRD patterns of as-prepared Cu-SSZ-13 zeolites synthesized in OH media (Examples 7-8)

Figure 5: PXRD patterns of as-prepared Cu-SSZ-13 zeolites synthesized in F media (Examples 9-10)

ONE-POT METHOD FOR THE SYNTHESIS OF CU-SSZ-13, THE COMPOUND OBTAINED BY THE METHOD AND USE THEREOF

This application is a 371 of PCT/EP2013/07585, filed Dec. 6, 2013.

The present invention relates to a method for the direct preparation of SSZ-13 zeolite containing copper atoms. This new method requires the specific combination of a copper polyamine complex and an additional organic molecule, which acts as organic structure directing agent (OSDA). The present invention also comprises the method of use of Cu-SSZ-13 materials synthesized following the present methodology as catalysts for the selective catalytic reduction (SCR) of NOx.

Zeolites are microporous materials formed by $TO_4$ tetrahedra (T=Si, Al, P, Ti, Ge, Sn . . . ) interconnected by the oxygen atoms creating pores and cavities with uniform size and shape in the molecular dimension range (3-15 Å).

The first synthetic zeolite was described by Barrer in 1948. [Barrer, J. Chem. Soc. 127 (1948)]. Since this discovery, more than 200 new zeolitic structures have been discovered, all of them containing different pore architectures (http://www.iza-online.org/). Indeed, zeolites can be classified depending on the size of their pores, whose ring openings are delimited by a number of T atoms. In this sense, small pore zeolites show openings with 8-T atoms, medium pore zeolites present openings with 10-T atoms, large pore zeolites have openings with 12-T atoms, and finally, extra-large pore zeolites present openings with more than 12-T atoms.

Those crystalline microporous materials have been broadly applied as excellent catalysts in numerous chemical processes. The use of a zeolite with specific physico-chemical properties for a particular chemical process will directly depend on the nature of reactants and products involved in the process (such as size, shape, hydrophobicity, etc.), and also on the reaction conditions. On one hand, the nature of the reactants and products will affect to the diffusion of those molecules within the pores and cavities of the zeolite, and consequently, the selection of the zeolite with the adequate pore topology for the chemicals involved in the reaction will be essential. On the other hand, the zeolite must be stable, both structurally and chemically, on the required reaction conditions.

The formation of nitrogen oxides (NOx) during the combustion of fossil fuels has become a real environmental problem, since they are one of the major air pollutants. Selective catalytic reduction (SCR) of NOx by ammonia has emerged as an efficient emission control.

Iwamoto et al. discovered that copper-exchanged zeolites, including Beta and ZSM-5, were active catalysts for the SCR of NOx [Iwamoto et al. J. Chem. Soc., Chem. Comm., 1986, 1272]. Unfortunately, these medium and large pore zeolites present low hydrothermal stability when reacting under the severe conditions required for the SCR of NOx (presence of steam at high temperatures).

In the last years, it has been described that some copper-containing small-pore zeolites show much better hydrothermal stability than large pore zeolites [Bull, et al. U.S. Pat. No. 7,601,662 (2009); Moliner, et al. PCT/EP2012/057795; Korhonen, et al, Chem. Commun., 2011, 47, 800]. This higher hydrothermal stability can be explained by the coordination of copper atoms to the double six-membered rings units (D6R) present in the large cavities of these small-pore zeolites, as suggested Fickel and Lobo [J. Phys. Chem. C., 2010, 114, 1633].

From all described small pore zeolites, CHA structure has received much attention. This material is formed by a three-directional small pore system (8-T atoms) containing large cavities with D6R cages in its framework.

The silicoaluminate form of CHA, SSZ-13 zeolite was first described by Zones in 1985 [U.S. Pat. No. 4,544,538 (1985)]. In this original patent, several OSDAs were reported for the preparation of SSZ-13, such as N,N,N-trimethyl-1-adamantammonium, N-methyl-3-quinuclidinol and N,N,N-trimethyl-2-ammonium exonorborane. As observed in the literature the preferred OSDA for the SSZ-13 synthesis is N,N,N-trimethyl-1-adamantammonium.

Recently, SSZ-13 has been synthesized by researchers at Chevron using as OSDA a mixture of N,N,N-trimethyl-1-adamantammonium and benzyl trimethylammonium [Zones, U.S. Patent 20080075656 (2008)] or using as the unique template benzyl trimethylammonium [Miller and Yuen, U.S. Pat. No. 8,007,764 (2011)].

As described, Cu-substituted small pore zeolites perform as excellent catalysts in the SCR of NOx with ammonia or hydrocarbons in the presence of oxygen. The conventional metal-containing zeolite (Me-zeolite) form is achieved by post-synthetic metal ion-exchange procedures. In this sense, several steps are required for achieving the Me-zeolite such as hydrothermal synthesis of the silicoaluminate, calcination to remove the OSDA, transformation to $NH_4$-form if required, metal ion exchange, and finally, calcination to obtain the final Me-zeolite. All these steps contribute to increase the overall cost of the material. The "one-pot" or direct synthesis of metallosilicoaluminates could considerably improve the economy of their preparation because most of the above described steps would be avoided making these directly-prepared materials very attractive for the industry. Very few examples can be found in the literature related to the direct synthesis of Cu-containing SSZ-13 zeolite.

On one hand, recent papers from Xiao et al. describe the "one-pot" synthesis of Cu-SSZ-13 using as unique template a copper-amine complex [Chem. Commun, 2011, 47, 9783; Chin. J. Catal. 2012, 33, 92]. In these works, they used a copper complex of $Cu^{2+}$ with tetraethylenepentamine (TEPA) as OSDA with the main objective to introduce cationic copper species in the SSZ-13 cages after the organic removal by calcination. However, from the examples described in these papers, it can be seen that the Si/Al ratios achieved in the final solids are very low (range between 4-7). These low Si/Al ratios can direct irreversible dealumination processes in the zeolite, and consequently, the deactivation of the catalyst when tested under realistic and severe reaction conditions (SCR of NOx requires high temperature and steaming). Indeed, as a general trend, the higher the Si/Al ratio the better the hydrothermal stability. Additionally, the different Cu-SSZ-13 examples reported by Xiao et al. show similar Cu-loadings (Cu/Si=0.09-0.10) despite the theoretical contents in the gels were different (Cu/Si=0.08-0.2). Therefore, the control of the Si/Al ratio and Cu content is not feasible by using the direct synthesis methodology based on the complex Cu-TEPA as the unique OSDA for the SSZ-13 preparation.

On the other hand, BASF researchers have reported the direct synthesis of Cu-containing SSZ-13 using specific mixtures of OSDAs in combination with an aqueous solution of Cu and ammonia [Trukhan et al. U.S. Patent 2011/0076229 (2011)]. As it can be seen in all the examples of this patent, the method reported by BASF researchers to prepare the one-pot synthesis of Cu-SSZ-13 always requires the specific combination of two organic ammonium cations (such as N,N,N-trimethyl-1-adamantammonium and benzyl trimethylammonium, N,N,N-trimethyl-1-adamantammonium and tetramethylammonium, or benzyl trimethylammonium and tetramethylammonium), and the addition of an organometallic complex formed by reacting ammonia with a copper salt.

It is the main object of the present invention to provide an improved process for the one-pot preparation of silicoaluminate SSZ-13 containing extra-framework copper atoms. The improved process involves a simple combination of a copper-polyamine complex with an additional and unique organic molecule acting as OSDA capable to template the SSZ-13 zeolite. Following this simple combination of a Cu-complex with the additional organic molecule is possible to direct the "one-pot" synthesis of Cu-SSZ-13 under broad Si/Al ratios and controlled Cu contents in the final zeolite. This new method clearly improves the physico-chemical properties of the Cu-SSZ-13 materials achieved following the Xiao's procedure [Chem. Commun, 2011, 47, 9783; Chin. J. Catal. 2012, 33, 92], and on the other hand, simplifies the preparation method reported by BASF researchers since only a single OSDA is required, and moreover, the use of ammonia is avoided.

Accordingly, in its broadest aspect the invention provides a process for the direct synthesis of Cu-SSZ-13 comprising the following steps:

(i) preparing a mixture containing water, at least one silicon source, at least one Al source, at least one Cu source, at least one polyamine for complexing with Cu, and a single OSDA component selected from N,N,N-trimethyl-1-adamantammonium, or benzyl trimethylammonium cations, optionally one or more precursors including alkali cations [Alk] and fluoride anions [F] to obtain a final synthesis mixture having the following molar composition:

$SiO_2$:a $Al_2O_3$:b Cu:c Polyamine:d OSDA:e $H_2O$:f Alk:g F wherein a is in the range from 0.007 to 0.16;
b is in the range from 0.001 to 0.6;
c is in the range from 0.001 to 0.6;
d is in the range from 0.001 to 2;
e is in the range from 1 to 200;
f is in the range from 0 to 1; and
g is in the range from 0 to 1;

(ii) hydrothermal treating the final synthesis mixture at a temperature of 80-200° C. until formation of a crystalline material of Cu-SSZ-13; and (iii) recovering the crystalline material of Cu-SSZ-13.

Figure 2:
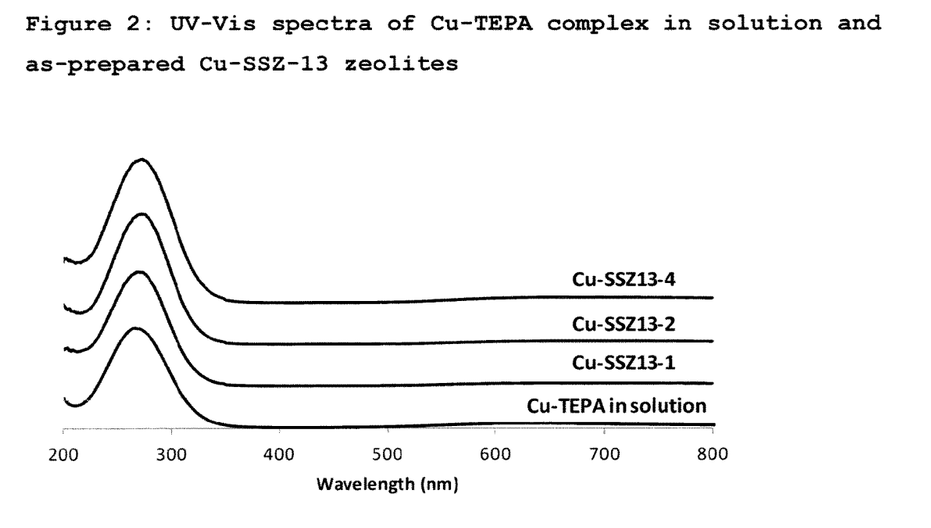
FIG. 2 shows UV-Vis spectra of Cu-TEPA complex in solution and as-prepared Cu-SSZ-13 zeolites.

The introduction of different amounts of a Cu-complex, as Cu-TEPA, with an additional organic molecule capable to direct SSZ-13 zeolite, such as N,N,N-trimethyl-1-adamantammonium or benzyl trimethylammonium, allows the direct manufacture of Cu-SSZ-13 zeolite with controlled Cu contents and Si/Al ratios. Interestingly, these Cu-complex molecules remain intact within the as-prepared SSZ-13 crystals after crystallization as revealed by UV-Vis spectroscopy (see FIG. 2) yielding active extra-framework copper cationic species after calcination.

In step (i) of the inventive process, all possible silicon, aluminum and copper sources may be employed in the preparation of Cu-SSZ-13.

Additionally, any polyamine or mixtures of different polyamine molecules capable of forming a complex structure with Cu atoms can be used, these include primary, secondary or tertiary amines.

Preferred polyamines are tetraethylenepentamine, triethylene-tetramine, 1,4,8,11-tetraazacyclotetradecane and 1,4,8,11-tetramethyl-1,4,8,11-tetraazacyclotetradecane.

The final synthesis mixture in step (i) comprises preferably the following molar compositions:
$SiO_2$:a $Al_2O_3$:b Cu:c Polyamine:d OSDA:e $H_2O$:f Alk:g F, wherein a is in the range from 0.01 to 0.06; more preferably in the range from 0.015 to 0.05, and more preferably in the range from 0.02 to 0.05;
b is in the range from 0.01 to 0.4, and more preferably in the range from 0.02 to 0.2;
c is in the range from 0.01 to 0.4, and more preferably in the range from 0.02 to 0.2;
d is in the range from 0.05 to 1, and more preferably in the range from 0.1 to 0.7;
e is in the range from 2 to 100, and more preferably in the range from 2 to 50;
f is in the range from 0 to 0.6, and more preferably in the range from 0 to 0.5; and
g is in the range from 0 to 0.6, and more preferably in the range from 0 to 0.5.

The crystallization step (ii) in the inventive process is performed by hydrothermal treatment in an autoclave, under static or dynamic conditions. The preferred temperature is ranged from 100 to 200° C., more preferably in the range of 130 to 175° C. The preferred crystallization time is ranged from 6 hours to 50 days, more preferably in the range of 1 to 20 days and more preferably in the range of 2 to 15 days. It should be taken into consideration that the components of the synthesis mixture may come from different sources, and depending on them, times and crystallization conditions may vary.

In order to facilitate the synthesis, crystals of SSZ-13 can be added as seeds in quantities up to 25% by weight respect to the total of oxides to the synthesis mixture. These can be added before or during the crystallization of Cu-SSZ-13.

After crystallization stage, Cu-SSZ-13 crystals are separated from the mother liquor. The solids can be washed and separated from the mother liquor by decantation, filtration, ultrafiltration, centrifugation, or any other solid-liquid separation technique.

The process of the present invention can further comprise a stage of elimination of the organic occluded inside the material, when the aim is to produce the calcined crystalline material. This can be performed by extraction and/or thermal treatment at temperatures over 25° C. during a period of time between 2 minutes and 25 hours.

The material produced by the invention may be pelletized in accordance with known techniques. They can also be used in different processes.

A further feature of the invention is a Cu containing molecular sieve having the framework structure of SSZ-13, obtainable by a process as described above.

Still a feature of the invention is a Cu containing molecular sieve having the framework structure of SSZ-13 and a molar composition:
$Cu_{0.005-0.15}Si_{0.88-0.98}Al_{0.02-0.12}O_2$ Another feature of the invention relates to the use of the above Cu containing molecular sieve having the framework structure of SSZ-13 in converting feeds formed from organic compounds by bringing said feed into contact with an active form of the porous crystalline material of the invention.

The present invention also relates to a method of use of those Cu-SSZ-13 materials synthesized by this simple cooperative procedure as active catalysts for the selective catalytic reduction (SCR) of NOx (see catalytic activity in Table 3).

Still a feature of the invention relates to the use of a Cu containing molecular sieve having the framework structure of SSZ-13 as catalyst for the selective reduction ("SCR") of nitrogen oxides (NOx) in a gas stream.

In particular, the SCR of NOx wherein the molecular sieve according to the present invention is used as catalyst in presence of a reductant, as ammonia, urea and/or hydrocarbon.

The catalytic activity in of the molecular sieve catalyst is summarized in Table 3 below.

EXAMPLES

Example 1

Synthesis of N,N,N-trimethyl-1-adamantammonium 29.6 g of 1-Adamantamine (Sigma-Aldrich) and 64 g of potassium carbonate (Sigma-Aldrich) were mixed with 320 ml of chloroform. At this point, 75 g of methyl iodide was added dropwise, while the reaction was stirred in an ice bath. The reaction is maintained during 5 days under agitation at room temperature. The mixture were filtered and washed with diethyl ether and the resultant solid further extracted with chloroform. The final product is N,N,N-trimethyl-1-adamantammonium iodide. This iodide salt is anion exchanged using an ion exchange resin achieving the hydroxide form.

Example 2

Direct Synthesis of "Cu-SSZ13-1" in OH Media 159 mg of a 20% wt aqueous solution of copper (II) sulfate (98% wt, Alfa) was mixed with 36 mg of tetraethylenepentamine (TEPA, 99% wt, Aldrich), and kept under stirring during 2 hours. Afterwards, 1041 mg of an aqueous solution of N,N,N-trimethyl-1-adamantammonium hydroxide (TMaDA, 16% wt), and 95 mg of an aqueous solution of sodium hydroxide (20% wt) were added and maintained under stirring during 15 minutes. Then 21 mg of aluminum hydroxide (66% wt, Sigma-Aldrich) and 607 mg of colloidal silica (Ludox AS40, 40% wt, Aldrich) were introduced in the synthesis mixture and maintained under stirring the required time to evaporate the solvent until the desired gel concentration. The final gel composition was $SiO_2$:0.033 $Al_2O_3$: 0.049 $Cu(TEPA)^{2+}$:0.19 TMaDA:0.12 NaOH:18.3 $H_2O$.

The gel was transferred to an autoclave with a Teflon liner, and heated to a temperature of 150° C. during 14 days under static conditions. The sample after hydrothermal crystallization was filtered and washed with abundant distilled water, and finally dried at 100° C.

Figure 1:
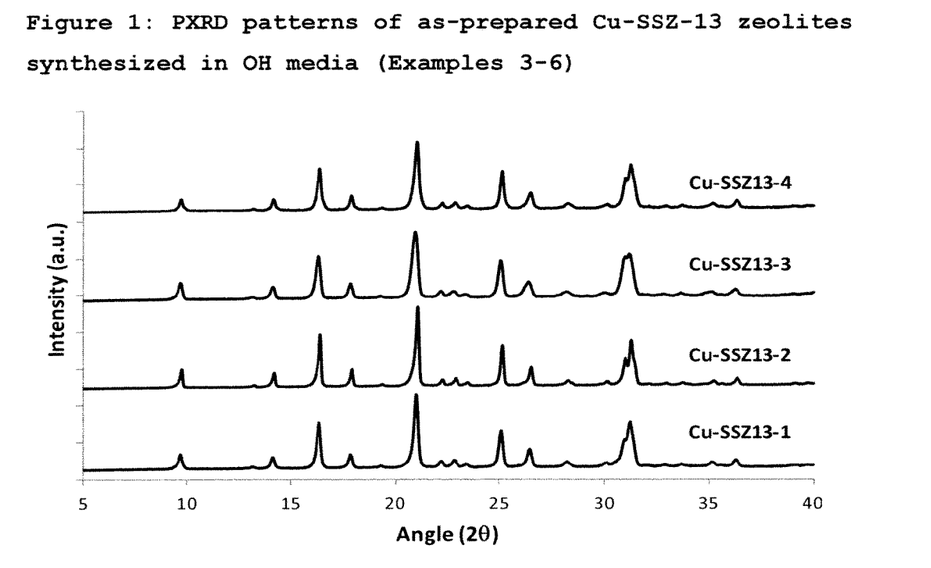
FIG. 1 shows PXRD patterns of as-prepared Cu-SSZ-13 zeolites synthesized in OH media (Examples 3-6)

The solid was characterized by Powder X-ray Diffraction (PXRD) obtaining the characteristic PXRD pattern of the SSZ-13 material (see Cu-SSZ13-1 in FIG. 1). The chemical analysis of the resultant solid indicates a Si/Al and Cu/(Si+Al) ratios of 13.9 and 0.03, respectively (see Table 1).

Figure 3:
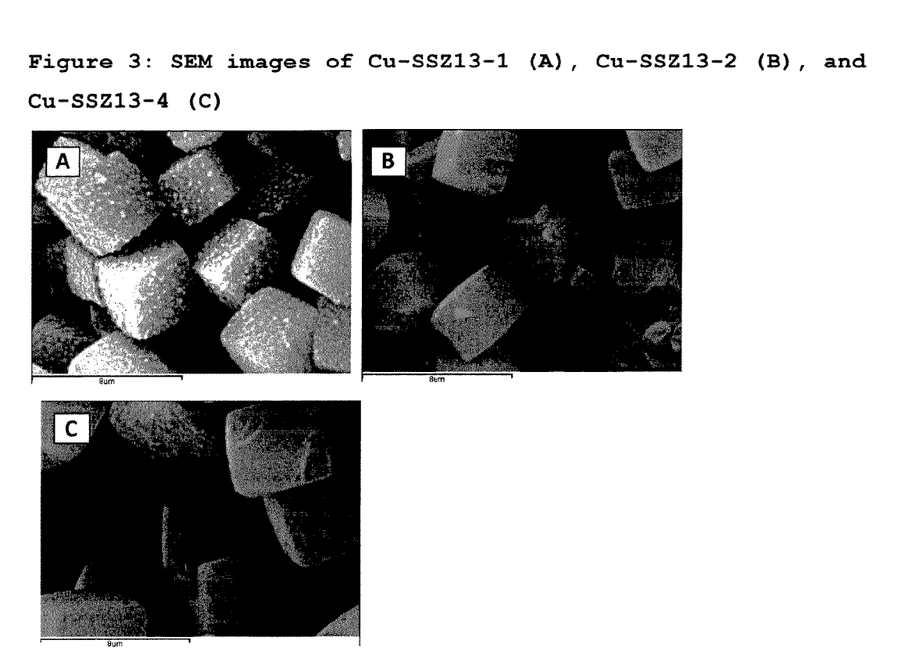
FIG. 3 shows SEM images of Cu-SSZ13-1 (A), Cu-SSZ13-2 (B), and Cu-SSZ13-4 (C).

Interestingly, Cu-complex molecules remain intact within the as-prepared SSZ-13 crystals (see Cu-SSZ13-1 in FIG. 2) and SEM images reveal an average crystal size of 4-7 μm (see Cu-SSZ13-1 in FIG. 3).

The Cu-containing SSZ-13 was calcined at 550° C. in air in order to remove the organic moieties precluded inside of the microporous material during the crystallization process.

Example 3

Direct Synthesis of "Cu-SSZ13-2" in OH Media 325 mg of a 20% wt aqueous solution of copper (II) sulfate (98% wt, Alfa) was mixed with 74 mg of tetraethylenepentamine (TEPA, 99% wt, Aldrich) and kept under stirring during 2 hours. Afterwards, 535 mg of an aqueous solution of N,N,N-trimethyl-1-adamantammonium hydroxide (TMaDA, 16% wt), and 161 mg of an aqueous solution of sodium hydroxide (20% wt) were added and maintained under stirring during 15 minutes. Then 21 mg of aluminum hydroxide (66% wt, Sigma-Aldrich) and 614 mg of colloidal silica (Ludox AS40, 40% wt, Aldrich) were introduced in the synthesis mixture, and maintained under stirring the required time to evaporate the solvent until the desired gel concentration. The final gel composition was $SiO_2$: 0.033 $Al_2O_3$: 0.10 $Cu(TEPA)^{2+}$ 0.10 TMaDA: 0.20 NaOH: 19.1 $H_2O$.

The gel was transferred to an autoclave with a Teflon liner and heated to a temperature of 150° C. during 14 days under static conditions. The sample after hydrothermal crystallization was filtered and washed with abundant distilled water, and finally dried at 100° C.

The solid was characterized by Powder X-ray Diffraction (PXRD) obtaining the characteristic PXRD pattern of the SSZ-13 material (see Cu-SSZ13-2 in FIG. 1). The chemical analysis of the resultant solid indicates a Si/Al and Cu/(Si+Al) ratios of 14.2 and 0.06, respectively (see Table 1). Interestingly, Cu-complex molecules remain intact within the as-prepared SSZ-13 crystals (see Cu-SSZ13-2 in FIG. 2) and SEM images reveal an average crystal size of 4-7 μm (see Cu-SSZ13-2 in FIG. 3).

The Cu-containing SSZ-13 was calcined at 550° C. in air in order to remove the organic moieties precluded inside of the microporous material during the crystallization process.

Example 4

Direct Synthesis of "Cu-SSZ13-3" in OH Media 143 mg of a 20% wt aqueous solution of copper (II) sulfate (98% wt, Alfa) was mixed with 33 mg of tetraethylenepentamine (TEPA, 99% wt, Aldrich) and kept under stirring during 2 hours. Afterwards, 951 mg of an aqueous solution of N,N,N-trimethyl-1-adamantammonium hydroxide (TMaDA, 16% wt) and 143 mg of an aqueous solution of sodium hydroxide (20% wt) were added and maintained under stirring during 15 minutes. Then 18 mg of aluminum hydroxide (66% wt, Sigma-Aldrich) and 511 mg of colloidal silica (Ludox AS40, 40% wt, Aldrich) were introduced in the synthesis mixture, and maintained under stirring the required time to evaporate the solvent until the desired gel concentration. The final gel composition was $SiO_2$: 0.034 $Al_2O_3$: 0.051 $Cu(TEPA)^{2+}$: 0.22 TMaDA: 0.21 NaOH: 20.7 $H_2O$.

The gel was transferred to an autoclave with a Teflon liner and heated to a temperature of 150° C. during 14 days under static conditions. The sample after hydrothermal crystallization was filtered and washed with abundant distilled water and finally dried at 100° C.

The solid was characterized by Powder X-ray Diffraction (PXRD) obtaining the characteristic PXRD pattern of the SSZ-13 material (see Cu-SSZ13-3 in FIG. 1). The chemical analysis of the resultant solid indicates a Si/Al and Cu/(Si+Al) ratios of 10.6 and 0.06, respectively (see Table The Cu-containing SSZ-13 was calcined at 550° C. in air in order to remove the organic moieties precluded inside of the microporous material during the crystallization process.

Example 5

Direct Synthesis of "Cu-SSZ13-4" in OH Media 278 mg of a 20% wt aqueous solution of copper (II) sulfate (98% wt, Alfa) was mixed with 64 mg of tetraethylenepentamine (TEPA, 99% wt, Aldrich) and kept under stirring during 2 hours. Afterwards, 941 mg of an aqueous solution of N,N,N-trimethyl-1-adamantammonium hydroxide (TMaDA, 16% wt), and 141 mg of an aqueous solution of sodium hydroxide (20% wt) were added and maintained under stirring during 15 minutes. Then 17 mg of aluminum hydroxide (66% wt, Sigma-Aldrich) and 531 mg of colloidal silica (Ludox AS40, 40% wt, Aldrich) were introduced in the synthesis mixture and maintained under stirring the required time to evaporate the solvent until the desired gel concentration. The final gel composition was $SiO_2$: 0.032 $Al_2O_3$: 0.095 $Cu(TEPA)^{2+}$: 0.21 TMaDA: 0.20 NaOH: 21.7 $H_2O$.

The gel was transferred to an autoclave with a Teflon liner and heated to a temperature of 150° C. during 14 days under static conditions. The sample after hydrothermal crystallization was filtered and washed with abundant distilled water and finally dried at 100° C.

The solid was characterized by Powder X-ray Diffraction (PXRD) obtaining the characteristic PXRD pattern of the SSZ-13 material (see Cu-SSZ13-4 in FIG. 1). The chemical analysis of the resultant solid indicates a Si/Al and Cu/(Si+Al) ratios of 11.2 and 0.08, respectively (see Table 1). Interestingly, Cu-complex molecules remain intact within the as-prepared SSZ-13 crystals (see Cu-SSZ13-4 in FIG. 2) and SEM images reveal an average crystal size of 4-7 μm (see Cu-SSZ13-4 in FIG. 3).

The Cu-containing SSZ-13 was calcined at 550° C. in air in order to remove the organic moieties precluded inside of the microporous material during the crystallization process.

Example 6

Direct Synthesis of "Cu-SSZ13-5" in OH Media 60 mg of a 20% wt aqueous solution of copper (II) sulfate (98% wt, Alfa) was mixed with 76 mg of a 20% wt aqueous solution of 1,4,8,11-tetraazacyclotetradecane (cyclam, 99% wt, Aldrich) and kept under stirring during 2 hours. Afterwards, 442 mg of an aqueous solution of N,N,N-trimethyl-1-adamantammonium hydroxide (TMaDA, 14.4% wt), and 58 mg of an aqueous solution of sodium hydroxide (20% wt) were added and maintained under stirring during 15 minutes. Then 8.2 mg of aluminum hydroxide (66% wt, Sigma-Aldrich) and 226 mg of colloidal silica (Ludox AS40, 40% wt, Aldrich) were introduced in the synthesis mixture and maintained under stirring the required time to evaporate the solvent until the desired gel concentration. The final gel composition was $SiO_2$: 0.035 $Al_2O_3$: 0.05 $Cu(cyclam)^{2+}$: 0.20 TMaDA: 0.20 NaOH: 20.4 $H_2O$.

The gel was transferred to an autoclave with a Teflon liner, and heated to a temperature of 150° C. during 12 days under static conditions. The sample after hydrothermal crystallization was filtered and washed with abundant distilled water and finally dried at 100° C.

Figure 4:
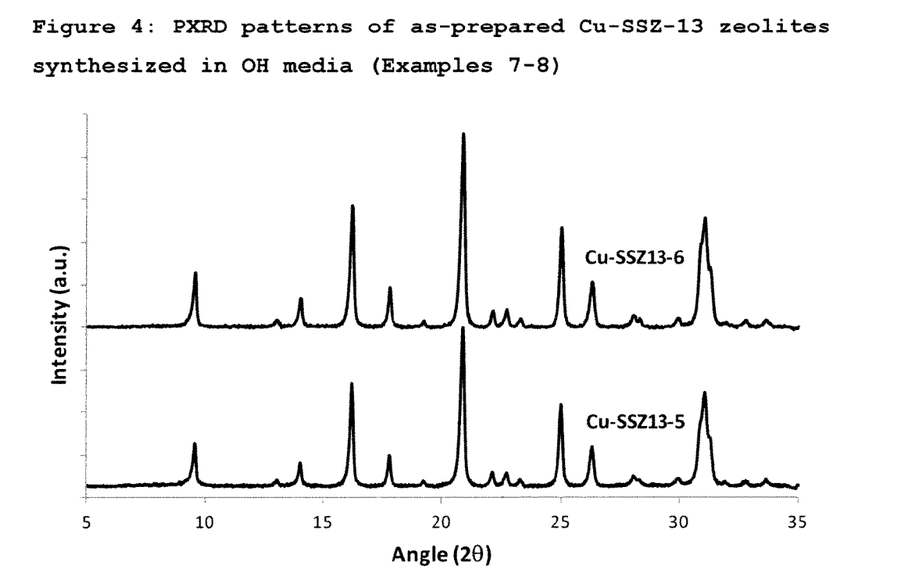
Figure 5:
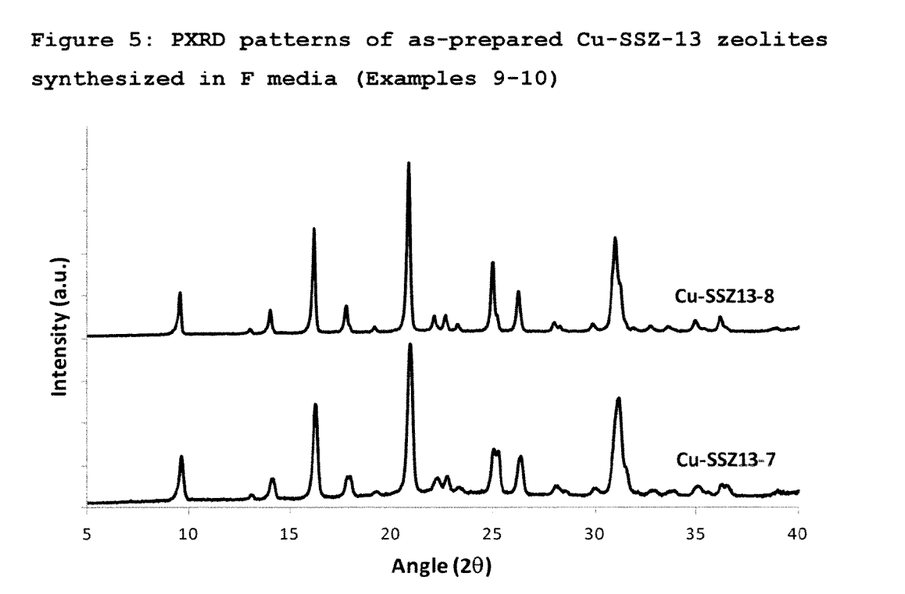

The solid was characterized by Powder X-ray Diffraction (PXRD) obtaining the characteristic PXRD pattern of the SSZ-13 material (see Cu-SSZ13-5 in FIG. 4).

The Cu-containing SSZ-13 was calcined at 550° C. in air in order to remove the organic moieties precluded inside of the microporous material during the crystallization process.

Example 7

Direct Synthesis of "Cu-SSZ13-6" in OH Media 60 mg of a 20% wt aqueous solution of copper (II) sulfate (98% wt, Alfa) was mixed with 11 mg of triethylenetetramine (TETA, 99% wt, Aldrich) and kept under stirring during 2 hours. Afterwards, 246 mg of an aqueous solution of N,N,N-trimethyl-1-adamantammonium hydroxide (TMaDA, 14.4% wt), and 60.8 mg of an aqueous solution of sodium hydroxide (20% wt) were added and maintained under stirring during 15 minutes. Then 8.6 mg of aluminum hydroxide (66% wt, Sigma-Aldrich) and 285.2 mg of colloidal silica (Ludox AS40, 40% wt, Aldrich) were introduced in the synthesis mixture and maintained under stirring the required time to evaporate the solvent until the desired gel concentration. The final gel composition was $SiO_2$:0.03 $Al_2O_3$:0.04 $Cu(TEPA)^{2+}$:0.1 TMaDA:0.2 NaOH:15 $H_2O$.

The gel was transferred to an autoclave with a Teflon liner, and heated to a temperature of 150° C. during 12 days under static conditions. The sample after hydrothermal crystallization was filtered and washed with abundant distilled water and finally dried at 100° C.

The solid was characterized by Powder X-ray Diffraction (PXRD) obtaining the characteristic PXRD pattern of the SSZ-13 material (see Cu-SSZ13-6 in FIG. 4).

The Cu-containing SSZ-13 was calcined at 550° C. in air in order to remove the organic moieties precluded inside of the microporous material during the crystallization process.

Example 8

Direct Synthesis of "Cu-SSZ13-7" in F Media 198 mg of a 20% wt aqueous solution of copper (II) sulfate (98% wt, Alfa) was mixed with 47 mg of tetraethylenepentamine (TEPA, 99% wt, Aldrich), and kept under stirring during 2 hours. Afterwards, 1335 mg of an aqueous solution of N,N,N-trimethyl-1-adamantammonium hydroxide (TMaDA, 16% wt) was added and maintained under stirring during 15 minutes. Then 16 mg of aluminum hydroxide (66% wt, Sigma-Aldrich) and 740 mg of colloidal silica (Ludox AS40, 40% wt, Aldrich) were introduced in the synthesis mixture and maintained under stirring. Next, 377 mg of an aqueous solution of ammonium fluoride (10% wt, Aldrich) was introduced in the gel and stirred the required time to evaporate the solvent until the desired gel concentration. The final gel composition was $SiO_2$: 0.02 $Al_2O_3$: 0.05 $Cu(TEPA)^{2+}$: 0.20 TMaDA: 0.20 F: 3.0 $H_2O$.

The gel was transferred to an autoclave with a Teflon liner and heated to a temperature of 150° C. during 14 days under static conditions. The sample after hydrothermal crystallization was filtered and washed with abundant distilled water and finally dried at 100° C.

The solid was characterized by Powder X-ray Diffraction (PXRD), obtaining the characteristic PXRD pattern of the SSZ-13 material (see Cu-SSZ13-7 in FIG. 4). The chemical analysis of the resultant solid indicates a Si/Al and Cu/(Si+Al) ratios of 23.7 and 0.01, respectively (see Table 1).

The Cu-containing SSZ-13 was calcined at 550° C. in air in order to remove the organic moieties precluded inside of the microporous material during the crystallization process.

Example 9

Direct Synthesis of "Cu-SSZ13-8" in F Media 128 mg of a 20% wt aqueous solution of copper (II) sulfate (98% wt, Alfa) was mixed with 30 mg of tetraethylenepentamine (TEPA, 99% wt, Aldrich) and kept under stirring during 2 hours. Afterwards, 1682 mg of an aqueous solution of N,N,N-trimethyl-1-adamantammonium hydroxide (TMaDA, 16% wt) was added and maintained under stirring during 15 minutes. Then 17 mg of aluminum hydroxide (66% wt, Sigma-Aldrich) and 476 mg of colloidal silica (Ludox AS40, 40% wt, Aldrich) were introduced in the synthesis mixture and maintained under stirring. Next, 473 mg of an aqueous solution of ammonium fluoride (10% wt, Aldrich) was introduced in the gel and stirred the required time to evaporate the solvent until the desired gel concentration. The final gel composition was $SiO_2$: 0.034 $Al_2O_3$: 0.05 $Cu(TEPA)^{2+}$: 0.40 TMaDA: 0.40 F: 3.7 $H_2O$.

The gel was transferred to an autoclave with a Teflon liner and heated to a temperature of 150° C. during 14 days under static conditions. The sample after hydrothermal crystallization was filtered and washed with abundant distilled water and finally dried at 100° C.

The solid was characterized by Powder X-ray Diffraction (PXRD) obtaining the characteristic PXRD pattern of the SSZ-13 material (see Cu-SSZ13-8 in FIG. 4). The chemical analysis of the resultant solid indicates a Si/Al and Cu/(Si+Al) ratios of 13.1 and 0.02, respectively (see Table 1).

The Cu-containing SSZ-13 was calcined at 550° C. in air in order to remove the organic moieties precluded inside of the microporous material during the crystallization process.

Example 10

Catalytic Tests on SCR of NOx Over Different Cu-SSZ13 Synthesized by the Present Invention The activity of the samples for the catalytic reduction of NOx was studied in a fixed bed, quartz tubular reactor of 2.2 cm of diameter and 53 cm of length. In a typical experiment the catalyst was prepared with a particle size of 0.25-0.42 mm. It was introduced in the reactor, heated up to 550° C. (see reaction conditions in Table 2) and maintained at these temperatures for one hour under nitrogen flow. After that the desired reaction temperature was set and the reaction feed admitted. The SCR of NOx was studied using $NH_3$ as reductor. The NOx present in the outlet gases from the reactor were analyzed continuously by means of a chemiluminiscence detector (Thermo 62C). The catalytic results are summarized in Table 3.

TABLE 1

Chemical analyses of Cu-SSZ-13 materials synthesized in the present invention

| Sample | Si/Al | Cu/(Si + Al) |
|---|---|---|
| Cu-SSZ13-1 | 13.9 | 0.03 |
| Cu-SSZ13-2 | 14.2 | 0.06 |
| Cu-SSZ13-3 | 10.6 | 0.06 |
| Cu-SSZ13-4 | 11.2 | 0.08 |
| Cu-SSZ13-7 | 23.7 | 0.01 |
| Cu-SSZ13-8 | 13.1 | 0.02 |

TABLE 2

Reaction conditions for SCR of NOx.

| | |
|---|---|
| Total gas flow (mL/min) | 300 |
| Catalyst load (mg) | 40 |
| NO concentration (ppm) | 500 |
| $NH_3$ concentration (ppm) | 530 |
| $O_2$ concentration (%) | 7 |
| $H_2O$ concentration (%) | 5 |
| Testing temperature interval (° C.) | 170-550 |

TABLE 3

NOx conversion (%) at various temperatures (200, 250, 300, 350, 400, 450, 500° C.) using different Cu-SSZ-13 materials synthesized following the methodology presented in this invention.

NOx conversion (%) at different temperatures

| | 200° C. | 250° C. | 300° C. | 350° C. | 400° C. | 450° C. | 500° C. |
|---|---|---|---|---|---|---|---|
| Cu-SSZ13-1 | 46 | 87 | 97 | 99 | 97 | 94 | 87 |
| Cu-SSZ13-2 | 61 | 96 | 99 | 100 | 97 | 91 | 86 |
| Cu-SSZ13-4 | 58 | 85 | 91 | 96 | 91 | 87 | 79 |

The invention claimed is:

1. Process for the direct synthesis of Cu-SSZ-13 comprising the following steps:
   (i) preparing a mixture containing water, at least one silicon source, at least one Al source, at least one Cu source, at least one polyamine for complexing with Cu and a single OSDA component selected from N,N,N-trimethyl-1-adamantammonium, or benzyl trimethylammonium cations, optionally one or more precursors including alkali cations [Alk] and fluoride anions [F] to obtain a final synthesis mixture having the following molar composition:

Si02: a A1203: b Cu: c Polyamine: d OSDA: e H20: f Alk: g F wherein
a is in the range from 0.007 to 0.16;
b is in the range from 0.001 to 0.6;
c is in the range from 0.001 to 0.6;
d is in the range from 0.001 to 2;
e is in the range from 1 to 200;
f is in the range from 0 to 1; and
g is in the range from 0 to 1;
   (ii) hydrothermal treating the final synthesis mixture at a temperature of 80-200° C. until formation of a crystalline material of Cu-SSZ-13; and
   (iii) recovering the crystalline material of Cu-SSZ-13.

2. The process of claim 1, wherein the at least one polyamine comprises primary, secondary and/or tertiary amines.

3. The process of claim 1, wherein the at least one polyamine is selected from tetraethylenepentamine, triethylene-tetramine, 1,4,8,11-tetraazacyclotetradecane, 1,4,8,11-tetramethyl-1,4,8,11-tetraazacyclotetradecane.

4. The process according to claim 1, wherein the final synthesis mixture has the following molar composition:

$SiO_2$: a $Al_2O_3$: b Cu: c Polyamine: d OSDA: e $H_2O$: f Alk: g F wherein
- a is in the range from 0.01 to 0.06; more preferably in the range from 0.015 to 0.05, and more preferably in the range from 0.02 to 0.05;
- b is in the range from 0.01 to 0.4, and more preferably in the range from 0.02 to 0.2;
- c is in the range from 0.01 to 0.4, and more preferably in the range from 0.02 to 0.2;
- d is in the range from 0.05 to 1, and more preferably in the range from 0.1 to 0.7;
- e is in the range from 2 to 100, and more preferably in the range from 2 to 50;
- f is in the range from 0 to 0.6, and more preferably in the range from 0 to 0.5; and
- g is in the range from 0 to 0.6, and more preferably in the range from 0 to 0.5.

5. The process according to claim 1, wherein the hydrothermal treating in step (ii) is performed in an autoclave under static or dynamic conditions.

6. The process according to claim 1, wherein the temperature for the hydrothermal treatment in step (ii) is between 100 and 200° C., more preferably between 130 and 175° C.

7. The process according to claim 1, wherein crystals of SSZ-13 are added as seeds to the mixture or to the final synthesis mixture in amounts up to 25% by weight calculated on the total amount of oxides.

8. The process according to claim 1, further comprising a step for removal of organic occluded inside the crystalline material of Cu-SSZ-13 by extraction and/or theimal treatment at temperatures over 25° C.

* * * * *